United States Patent
Nyboer

[11] 3,793,729
[45] Feb. 26, 1974

[54] GRIPPING DEVICE ASSEMBLY FOR TENSIONED PLIABLE ELONGATE MEMBER

[76] Inventor: Robert P. Nyboer, 2016 Calle Candela, Fullerton, Calif. 92632

[22] Filed: Sept. 22, 1972

[21] Appl. No.: 291,313

[52] U.S. Cl. ............................... 32/23, 24/132
[51] Int. Cl. ............................................. A61c 1/00
[58] Field of Search ............... 32/22, 23; 24/132

[56] References Cited
UNITED STATES PATENTS

| | | | |
|---|---|---|---|
| 3,695,258 | 9/1972 | Fulton et al. | 32/22 |
| 3,514,171 | 5/1970 | McGaha | 32/22 |
| 3,429,516 | 2/1969 | Sharp et al. | 32/22 |
| 3,427,719 | 2/1969 | Gordon et al. | 32/22 |
| 2,328,924 | 9/1943 | Ruff | 32/22 |
| 1,779,430 | 10/1930 | Gronquist | 24/132 |
| 2,056,154 | 10/1936 | Benson | 24/132 |
| 1,276,365 | 8/1918 | Hopkins | 24/132 |

Primary Examiner—Louis G. Mancene
Assistant Examiner—J. Q. Lever

[57] ABSTRACT

An assembly that is preferably used in conjunction with a hand-holdable instrument that has an elongate pliable member extending therefrom to a source of power that serves to actuate the instrument. The assembly includes a housing that is located in a fixed base position relative to the source of power, and the housing having the elongate pliable member extending through a confined space therein. The confined space is partially defined in the housing by a top and a bottom, with the bottom including an inclined surface on which a rotatable member is movably supported. Means for maintaining tension on the elongate pliable member are disposed between the source of power and the housing.

The housing is preferably capable of removably supporting the instrument at a first position thereon. When the instrument is moved outwardly from the housing without the pliable elongate member contacting the rotatable member, tension is maintained on the elongate member until the instrument is moved downwardly to bring the elongate member into frictional contact with the rotatable member. The instrument is then allowed to move toward the housing a short distance due to the tension on the elongate member, with the rotatable member now rolling up the inclined surface to frictionally grip the pliable elongate member between the rotatable member and the top of the housing. The portion of the elongate member extending outwardly from the housing to the instrument is now free of tension and the instrument may be maneuvered without any restraint thereon. After the instrument has been used, the instrument is returned to the first position by reversing the above-described steps.

9 Claims, 5 Drawing Figures

PATENTED FEB 26 1974 3,793,729

GRIPPING DEVICE ASSEMBLY FOR TENSIONED PLIABLE ELONGATE MEMBER

BACKGROUND OF THE INVENTION

1. Field of the Invention

Gripping device assembly for tensioned pliable elongate member.

2. Description of the Prior Art

It is common practice in the dental profession to have a hand-holdable instrument adjacent the patient's chair, which instrument is powered through a pliable elongate member, such as a hose or the like, and which member extends to a source of power to energize the instrument. Various forms of spring-loaded reels and like apparatus have been devised and used in the past to maintain tension on the pliable elongate member and retrieve the same when the dentist has completed using the instrument to which it is connected.

Although such prior art devices have stops associated therewith, such devices are inconvenient to use due to the length of hose that must be withdrawn to actuate the stops and the frequency that they require maintenance attention to operate satisfactorily.

The primary purpose in devising the present invention is to supply an assembly that will maintain tension on the elongate pliable member and retract the latter, but by a simple sequence of manual operations on the part of the dentist a portion of the elongate pliable member may be withdrawn from a housing, and the portion of the withdrawn elongate pliable member that is connected to the instrument to be used by the dentist will thereafter be free of tension, to permit the instrument to be used without any restraint thereon.

SUMMARY OF THE INVENTION

A rigid housing that has an elongate pliable member extending movably therethrough, with the elongate pliable member being connected on one end to a source of power, and the opposite end to a hand-holdable instrument that is energized by said power. The housing occupies a fixed position.

The housing, which may be formed from any rigid material, includes a bottom, a top, a pair of side walls, and first and second end walls that cooperate to define a confined space therein. The first and second end walls have openings formed therein through which the pliable elongate member extends, and the bottom includes an inclined interior surface on which a rollable member is mounted, with the rollable member when in pressure contact with the exterior surface of the pliable elongate member frictionally gripping the latter.

The instrument, when in a first position, is removably supported on the housing. Intermediate the housing and the source of power, means are provided that at all times maintains tension on the pliable elongate member. When the instrument is manually withdrawn from the housing and moved to a second position, and this movement occurring without the elongate member contacting the rollable member, tension is maintained on the entire length of the pliable elongate member. After the instrument has been moved to the second position, it is moved downwardly therefrom to a position where the pliable elongate member pressure contacts the rollable member, with the instrument then being moved towards the housing for a short distance. This movement of the instrument towards the housing results in the rollable member frictionally engaging the elongate member, and the rollable member rolling up the inclined surface to grip the pliable elongate member between the top and the rollable member. The portion of the pliable elongate member extending outwardly from the housing to the instrument is now free of tension and the instrument may be used without any restraint thereon.

After the instrument has been used to the desired extent, the instrument is moved outwardly away from the housing and upwardly relative thereto, to permit the elongate member to become disengaged from the rollable member, which rollable member now rolls by gravity to the bottom of the inclined surface. The means that apply tension to the elongate pliable member are now allowed to move the pliable elongate member through the housing to permit the instrument to be supported at the first position thereon. The instrument will so remain until again needed, whereupon the above-described operation is repeated.

DESCRIPTION OF THE PREFERRED EMBODIMENT

Figure 1:
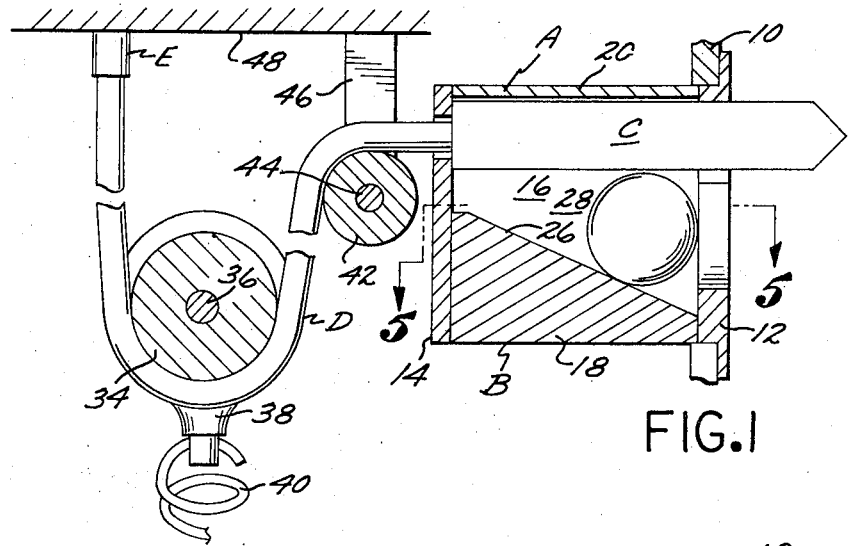
FIG. 1 is a longitudinal cross-sectional view of the assembly, illustrating the tension applying means, and the housing that serves as a support for the instrument when not in use.
Figure 2:
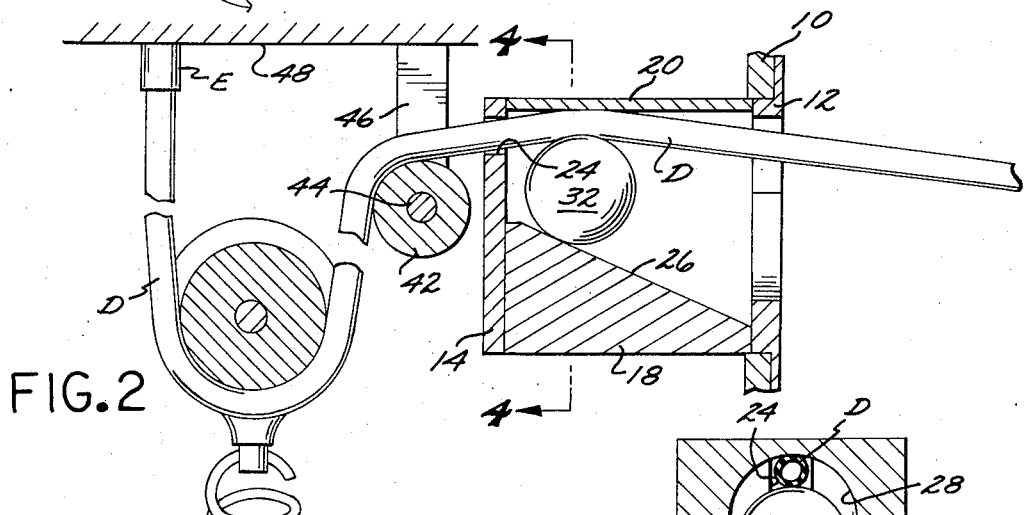
FIG. 2 is the same longitudinal cross-sectional view as shown in FIG. 1, but with the instrument having been withdrawn from the housing, and a ball or other rollable member having moved upwardly on an inclined surface to frictionally grip the pliable elongate member to permit the portion of the elongate pliable member extending to the instrument to be used without tension being exerted on this portion of the elongate member.

The assembly A, as may best be seen in FIGS. 1 and 2, which is particularly adapted for use by dentists, includes a housing B and a hand-holdable instrument C that may be removably supported at a first position on the housing. The instrument C has a pliable elongate member D that extends therefrom and passes through the housing B to a source of power E that is used in actuating the instrument. The source of power E may be one that supplies electric power, a liquid under pressure, or air at a positive or negative pressure, depending on the nature of the instrument C. Intermediate the source of power E and the housing B are provided means F for maintaining tension at all times on the pliable elongate member D.

The housing B is supported in a fixed position by a bracket or wall 10, or other conventional supporting means adjacent a dental chair (not shown). The housing B may be made from any desired rigid material, such as plastic or the like, and includes first and second end walls 12 and 14, respectively, a pair of side walls 16, a bottom 18 and a top 20. The housing B, as will be seen in the drawing, is of rectangular shape. The first end wall 12 is illustrated in the drawings as being bonded to first end surfaces of side walls 16, bottom 18 and top 20 and removably supported on the bracket 10 by screws 22, although other conventional fastening means may be employed. The second end wall 14, as may best be seen in FIG. 1, is similarly bonded to second end surfaces of side walls 16, bottom 18 and top 20, and has in the upper central portion thereof an opening 24 of sufficient transverse cross section as to permit the pliable elongate member D to pass freely therethrough.

Figure 3:
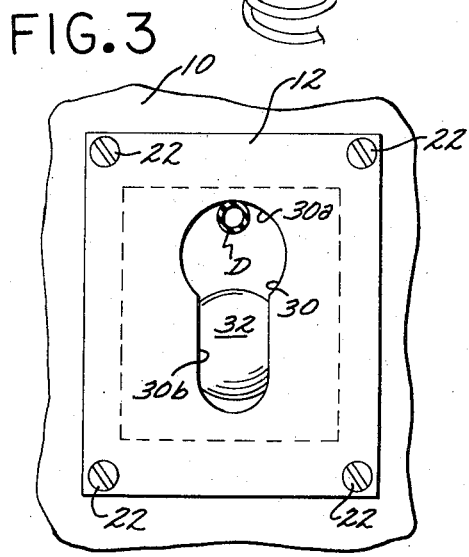
FIG. 3 is a front elevational view of the housing.
Figure 4:
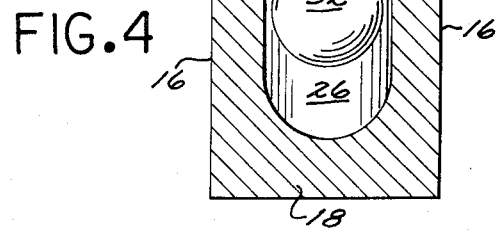
FIG. 4 is a transverse cross-sectional view of the housing taken on the line 4—4 of FIG. 2.
Figure 5:
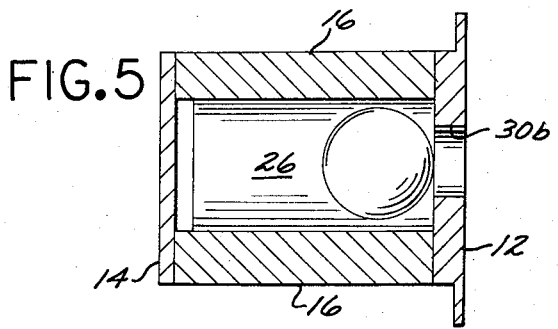
FIG. 5 is a longitudinal cross-sectional view of the housing taken on the line 5—5 of FIG. 1.

Bottom 18, as can be seen in FIGS. 1 and 2, defines an upwardly inclined surface 26 that extends from the lower portion of the first end wall 12 to the second end wall 14. The inclined surface 26, together with the interior surfaces of the first and second end walls 12 and 14, as well as the interior surface of the top 20, cooperate to define an elongate confined space 28. The first end wall 12, as may best be seen in FIG. 3, has a keyhole shaped opening 30 defined therein which includes an upper portion 30a of sufficient cross section as to permit the instrument C to pass longitudinally therethrough, and an elongate lower portion 30b that is of greater width than the diameter of the pliable elongate member D.

A ball 32 is disposed within the confined space 28 and is of a diameter slightly less than the width of the confined space 28. The diameter of the ball 32 is greater than that of the opening portion 30a, as well as being greater than the width of the opening portion 30b, to prevent the ball inadvertently being displaced from the confined space 28. The diameter of the ball 32 is such that when the ball is resting in the confined space 28 and in contact with the first end wall 12, the upper surface of the ball is so disposed as to support the instrument C, as illustrated in FIG. 1. The ball 32 is preferably formed from a resilient material which has a high coefficient of friction when urged into pressure contact with the exterior surface of the pliable elongate member D.

The means F for applying tension is preferably a pulley 34 that is rotatably supported on a stub shaft 36 that is secured to a body 38 that is at all times urged downwardly by a conventional means such as tensioned helical spring 40 or by gravity due to a weight (not shown). An idling pulley or roller 42 is rotatably supported on a stub shaft 44 that is secured to a bracket 46 that extends to a convenient surface defining member 48 located at a convenient position in a dentist's office, preferably adjacent the dental chair.

Both the pulley 34 and the roller 42 are intermediately positioned between the source of power E and the housing B. The roller 42, although absolutely not necessary, does serve the useful function of preventing the pliable elongate member D being forced downwardly to frictionally engage the lower portion of the opening 24 when the means F is applying a downwardly directed force on the pliable elongate member D to tension the latter.

The use and operation of the invention is extremely simple. When it is desired to use the hand-holdable instrument C, the instrument is withdrawn from the housing B with the pliable elongate member D being drawn longitudinally through the confined space 28 and contacting the upper portion of the opening 30a. The pliable elongate member D as it is so moved through the housing does not contact the ball 32 and the ball remains in the position illustrated in FIG. 1. After the instrument C has been moved outwardly from the housing B to a desired second position, the instrument C is moved downwardly to the extent that a portion of the pliable elongate member D within the confined space 28 contacts the upper surface of the ball 32. The tension on the pliable elongate member D is now allowed to move the instrument towards the housing B, and pliable elongate member D, as it moves to the left as viewed in FIGS. 1 and 2, causes the ball 32 to roll up the inclined surface 26. The ball 32 so continues to move upwardly on the inclined surface 26 until the ball 32 and the interior surface of the top 20 frictionally grip the pliable elongate member D therebetween, and prevent the pliable elongate member from moving further to the left. The portion of the pliable elongate member D that extends outwardly from the housing B to the instrument C is now free of tension and the instrument C may be used without any restraint being exerted thereon.

When it is desired to return the instrument to the position shown in FIG. 1, the instrument and elongate member D are moved away from the housing B and upwardly to the extent that the elongate member D is no longer in pressure contact with the ball 32. The ball 32 now rolls to the bottom of the inclined surface 26 due to gravity. The tension of elongate member D is now allowed to move the elongate member to the left without contacting ball 32 until the instrument has been returned to the first position illustrated in FIG. 1. The instrument C will so remain until again needed by the dentist, whereupon the above-described operation will be repeated.

I claim:

1. In combination with a hand-holdable elongate instrument that is powered by a pliable elongate member that has a first end thereof connected to said instrument and a second end of said pliable member connected to a source of power at a fixed position, an assembly for tensioning said member and removably supporting said instrument at a fixed first position when not in use, with said assembly permitting said instrument to be used with only the portion of said pliable member necessary to reach from said first position to a second position to which said instrument is moved and without said portion of said pliable member being subjected to tension, and said assembly when said instrument is no longer required subjecting all of said elongate pliable member to tension to permit said instrument to be returned to said first position, said assembly including:

a. a rigid housing at said first position that includes a bottom, a top, a pair of side walls, and first and second end walls that cooperate to define a confined space, said first end wall being most adjacently disposed to said source of power, said bottom defining an inclined interior surface that extends upwardly from said second end wall to said first end wall, an opening in said first end wall above the upper limit of said inclined surface and of sufficient transverse area to permit said pliable member to be freely movable therein, and a vertically extending slot in said second end wall through which said elongate pliable member extends, said slot having a first lower end and an upper second end, said slot of sufficient width as to permit at least a portion of said instrument to be moved through said slot for said instrument to be removably supported by said housing;

b. a rollable member in said confined space and movable on said inclined surface, said rollable member having an exterior surface that frictionally engages said pliable member when in pressure contact with said pliable member, said rollable member having a diameter of such magnitude as to provide above said first end of said slot when said rollable member is in a first position in contact with said second end wall, said diameter being so related to said second end of said slot as to permit said instrument to be at least partially disposed in said housing when said rollable member is in said first position, and said rollable member when in said first position not being contacted by said elongate member when said member is moved outwardly and away from said second end wall and in sliding contact with said second end of said slot;

c. means intermediate said source of power and said housing that maintain tension on said pliable elongate member as said instrument is moved away from said housing, with said pliable elongate member out of contact with said rollable member, and with the portion of said pliable elongate member between said housing and instrument being relieved of tension when said pliable elongate member is moved downwardly in said slot to pressure contact said rollable member and then allowed to move towards said housing to roll said rollable member upwardly on said inclined surface for said pliable elongate member to be frictionally gripped between said rollable member and said top, and the portion of said elongate member between said instrument and said housing having tension reapplied thereto by moving said portion away from said housing to allow said rollable member to roll by gravity to the bottom of said inclined surface.

2. The assembly as defined in claim 1 in which said pliable elongate member is a hose.

3. The assembly as defined in claim 1 in which said pliable elongate member is an insulated electrical conductor.

4. The assembly as defined in claim 2 in which said elongate hand-holdable instrument is a dental instrument.

5. The assembly as defined in claim 3 in which said elongate hand-holdable instrument is a dental instrument.

6. The assembly as defined in claim 2 in which said rollable member is formed from a soft, resilient material that has a substantial coefficient of friction with said hose when in pressure contact with the latter.

7. The assembly as defined in claim 1 in which said means includes:
 d. a rotatable member in rolling contact with said pliable elongate member; and
 e. a horizontal shaft on which said rotatable member is rotatably mounted;
 f. a rigid body that supports said shaft; and
 g. a tensioned spring connected to said body that at all times tends to move said rotatable member, shaft and body in a direction to maintain a portion of said pliable elongate member situated between said source of power and said housing under tension.

8. The assembly as defined in claim 1 in which said means includes;
 d. a rotatable member in rolling contact with said pliable elongate member;
 e. a horizontal shaft on which said rotatable member is rotatably mounted;
 f. a rigid body that supports said shaft; and
 g. a weight secured to said body that at all times tends to move said rotatable member, shaft, and body in a direction to maintain a portion of said pliable elongate member situated between said source of power and said housing under tension.

9. The assembly as defined in claim 1 in which said rollable member is a ball of a diameter slightly less than the width of said confined space.

* * * * *